Aug. 3, 1943.  T. J. MORAN  2,325,699
COWL FASTENER
Filed Oct. 12, 1942
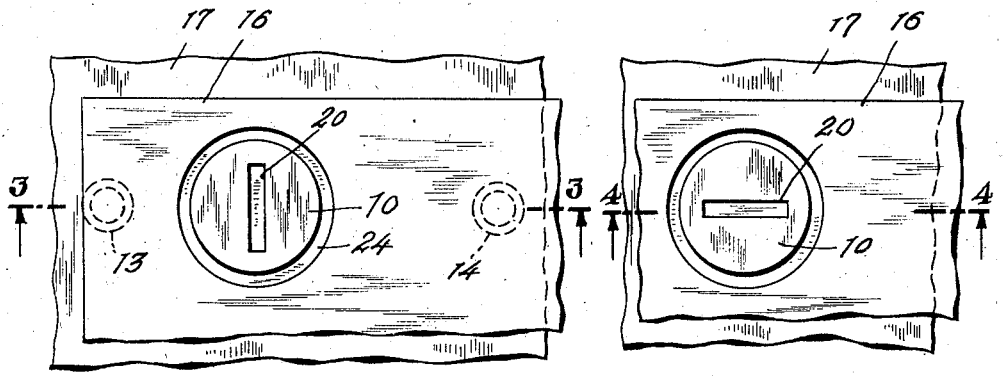
Fig. 1  Fig. 2
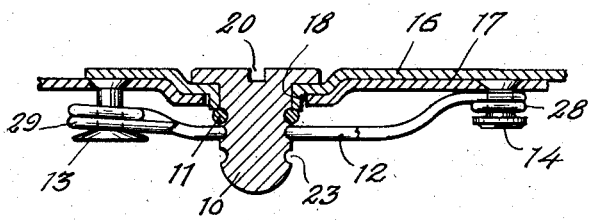  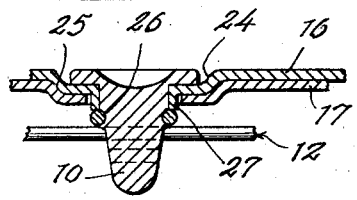
Fig. 3  Fig. 4
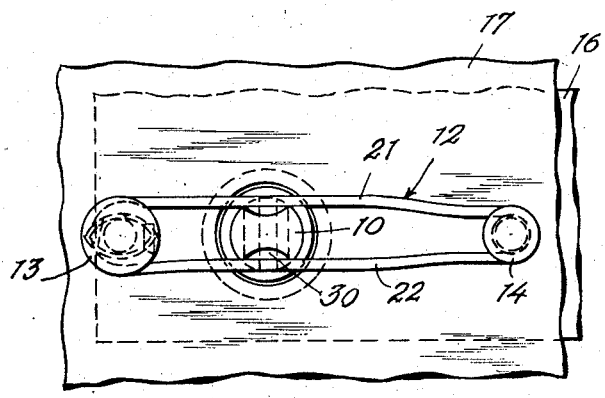  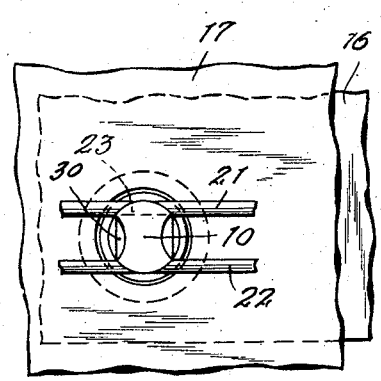
Fig. 5  Fig. 6
INVENTOR
TERENCE J. MORAN
BY
W. Stack
ATTORNEY Patented Aug. 3, 1943

2,325,699

UNITED STATES PATENT OFFICE 2,325,699

COWL FASTENER

Terence J. Moran, Freeport, N. Y.

Application October 12, 1942, Serial No. 461,812

2 Claims. (Cl. 24—221)

My invention relates to devices for fastening cowls, hoods, panels, inspection doors, or the like, to other structural parts or bodies.

In an airplane, for instance, it is customary to cowl-in or enclose the engine or power plant by one or more cowls or panels. Such cowls or panels are usually fastened to one another or to the fuselage frame by cowl fasteners of one form or another, and it is to this particular type of fastener that the present invention is addressed.

The object of the invention is to simplify and generally improve upon that type cowl fastener heretofore extensively used. It comprises but five parts, to wit, a locking stud, a retaining ring, a spring and two rivets—all stock items so interconnected and related as to admit of ease of operation of the assembled invention without the aid of any tool other than an ordinary screwdriver.

In the drawing, wherein like reference characters denote like or corresponding parts:

Fig. 1 is a side elevation of the cowl fastener with the stud turned through 90° to admit of the cowl release;

Fig. 2 is a similar view showing the position of the stud when the cowl is locked;

Fig. 3 is a section on the line 3—3 of Fig. 1;

Fig. 4 is a section on the line 4—4 of Fig. 2, and

Figs. 5 and 6 show the cowl fastener of Figs. 1 and 2 as viewed from the opposite side.

The drawing is illustrative of the principle on which the lock stud mechanism operates. The actual design of the stud and its associated parts, however, can be varied somewhat to suit specific requirements, as obviously the device can be used in fields other than aircraft, as for example, for fastening panels, inspection plates and guards on machine tools and the like.

The complete device, as previously stated, comprises but five parts—a stud 10, a retaining ring 11, spring 12, and rivets 13 and 14. In the embodiment shown the head of the lock stud 10 is used to fasten a sheet metal panel 16 to the fuselage 17 of an airplane. In this particular assembly the stud remains attached to the panel 16 when the latter is released or removed. To replace or fasten the panel, it is only necessary to enter the stud in a hole 18, formed in the fuselage 17; press the panel into place; and then give the stud a quarter turn with a screw-driver or other similar tool inserted in a slot 20 formed for this purpose in the head of the stud. This simple manipulation, in and of itself, allows the two arms 21 and 22 of the spring 12 to snap into one or another of two or more pairs of grooves 23 formed in the sides of the stud. Thus fitted, the cowl or panel 16 is securely held in place. Note that the quarter turn referred to may be given the stud 10 in either direction.

As shown in Fig. 3, the panel 16 is indented or dimpled as at 24 to fit into a similar indentation 25 formed in the fuselage 17 so that the head of the stud may be brought flush with the outer surface of the panel. To hold the stud 10 in its hole in the panel, the retaining ring 11 is provided. This ring is adapted, when sprung into place, to not only fit within a groove 26 formed in the stud, but also to bear at one side against an annular flange 27 formed on the panel and fitted in the hole 18 of the fuselage. Thus assembled or fitted the ring 11 serves as a holding means for the stud permitting of its free rotation when locking or releasing the panel.

Spring 12, which provides the stud lock, is held in position on the fuselage 17 by the rivets 13 and 14. This spring has a coil 28 at one end similar to that at the end of a safety or blanket pin. The coil 28 is so wound, however, that the tension in the spring tends to close the opposite ends or arms rather than spread or open them, and hence grip and hold the stud 10 when fitted between the spring arms. Coil 28 is held in position by the rivet 14 whereas the ends of the two arms of the spring 12 opposite to the coil 28 are each formed into a loop 29, the inside diameter of each of which is considerably larger than the shank of the rivet 13 while the outside diameter is about the same in size as the diameter of the rivet heads. This construction allows the outer ends of the spring to be forced or sprung apart when the stud 10 is inserted between the spring arms.

Referring to Figs. 3 and 5, it will be noted that the stud is slightly tapered and that the sides thereof parallel with the arms of the spring 12 are milled off or flattened as indicated at 30. This flattening of the stud sides permits it to be inserted between the spring arms. The sides of the stud at right angles to the flattened sides, however, are provided with the one or more parallel grooves 23, and it is into one or the other of these pairs of grooves 23 that the spring arms snap under tension to hold the stud securely in place when it is desired to lock the panel 16 to the fuselage 17. More than one pair of grooves is required to be provided only in cases where two thicknesses of metal or panelling are to be fastened to the fuselage. In either case it is the pressure of the spring arms which prevents turning of the stud 10 as well as its being withdrawn from the hole 18 until it is turned to bring the flattened sides parallel to and in contact with the spring arms.

From the foregoing, it will be at once apparent that the fastener of my invention is positive in action, fool-proof, simple in construction, and inexpensive to manufacture. As the fastener is under tension (locked or unlocked), wear is minimized, and since the stud 10 can be turned in either direction, obviously it cannot be turned too far. A full rotation of the stud only successively locks and unlocks the fastener, and no damage, as in prior devices, can result. Moreover, only conventional items are required to be used in the fabrication of the fastener. The holes provided are full round, and regular in form, and no costly housings or other parts are required. In other words, the fastener, while it possesses all of the virtues of prior types, is characterized by utter simplicity of detail and design.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a member and a structure to which said member is adapted to be fastened, said structure having formed therein an opening, of a fastener for said member comprising an elongated spring having yieldingly spreadable spaced arms, a coil at one end thereof tending to resist spreading of the arms, and loops at the opposite end thereof by means of which the spread of the arms is confined within prescribed limits; said spring being fastened to said structure by rivets passing through said coil and said loops respectively and said spring arms being adapted to extend crosswise said opening, and a locking stud carried by and rotatable to release said cowl, said stud having a shank portion insertible through said opening to engage between and yieldingly spread said spring arms, said shank portion being provided with opposed substantially flat sides and opposed transversely grooved sides respectively with which said arms are adapted to engage accordingly as said stud is rotated.

2. The combination with a member and a structure to which said member is adapted to be fastened, said structure having formed therein an opening; of a fastening means for said member comprising an elongated spring having yieldingly spreadable normally parallel spaced spring arms adapted to extend crosswise said opening, said spring being formed from a single length of wire, a coil at one end of said spring tending to resist spreading of said arms, said coil being formed by bending said length of wire intermediately of its ends, loops at the opposite end of said spring adapted to confine the spread of said arms within prescribed limits, said loops being formed by bending the wire length at its opposite ends, rivets fastened to said structure and extended one through said coil and the other through said loops to fasten said spring to said structure, the difference in diameter of the loops on the one hand and the shank of the rivet passing therethrough on the other hand determining the extent of spread accorded said arms, and a locking stud carried by and rotatable to lock and release said member, said stud having a shank portion tapered toward one end and insertible through said opening to engage between and yieldingly spread said arms due to said taper, said shank portion being provided on its non-tapered sides with transversely extending grooves within which said spring arms are adapted to engage as said stud is rotated to lock said stud to said structure.

TERENCE J. MORAN.